US 8,278,600 B2

(12) United States Patent  (10) Patent No.: US 8,278,600 B2
Justice  (45) Date of Patent: Oct. 2, 2012

(54) WELDING CONTRACTOR APPARATUS WITH IMPROVED HEAT DISSIPATION

(75) Inventor: Kenneth L. Justice, Wickliffe, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1165 days.

(21) Appl. No.: 11/946,248

(22) Filed: Nov. 28, 2007

(65) Prior Publication Data

US 2009/0134137 A1 May 28, 2009

(51) Int. Cl.
*B23K 9/28* (2006.01)
*H01H 73/00* (2006.01)
*F16B 37/00* (2006.01)

(52) U.S. Cl. ................................................. 219/137.2
(58) Field of Classification Search .................. 219/136, 219/137.2, 137.31, 137.71; 335/282, 299, 335/300; 336/61, 192
See application file for complete search history.

(56) References Cited

U.S. PATENT DOCUMENTS

| | | | |
|---|---|---|---|
| 2,014,231 A * | 9/1935 | Garrett | 411/158 |
| 2,933,573 A | 4/1960 | Strider | |
| 3,225,232 A | 12/1965 | Turley et al. | |
| 3,564,467 A * | 2/1971 | Swindler et al. | 335/132 |
| 4,043,369 A * | 8/1977 | Abernethy | 411/277 |
| 4,496,923 A * | 1/1985 | Lenzing | 336/61 |
| 5,521,566 A * | 5/1996 | Krubsack et al. | 335/126 |
| 6,479,795 B1 * | 11/2002 | Albrecht et al. | 219/137.2 |
| 6,784,772 B1 * | 8/2004 | Brandon et al. | 336/192 |
| 6,943,655 B1 * | 9/2005 | McMahon et al. | 335/299 |
| 2002/0122289 A1 | 9/2002 | Meiners et al. | |
| 2005/0190024 A1 | 9/2005 | McMahon et al. | |
| 2005/0213960 A1 * | 9/2005 | Baldwin et al. | 396/439 |
| 2006/0171090 A1 | 8/2006 | Enyedy et al. | |
| 2006/0193098 A1 | 8/2006 | Justice et al. | |
| 2007/0151965 A1 * | 7/2007 | Mormino, Jr. | 219/137.2 |

FOREIGN PATENT DOCUMENTS

| | | |
|---|---|---|
| EP | 0484291 A | 5/1992 |
| EP | 1754563 A | 2/2007 |

OTHER PUBLICATIONS

International Search Report dated Apr. 1, 2009.
International Report on Patentability (IPRP) issued in PCT/IB2008/003230, filed Nov. 25, 2008 (Publication No. WO/2009/068966 which published on Jun. 4, 2009); May 28, 2010; 5 pages.
Written Opinion of the International Searching Authority issued in PCT/IB2008/003230, filed Nov. 25, 2008 (Publication No. WO/2009/068966 which published on Jun. 4, 2009); Apr. 1, 2009; 6 pages.

* cited by examiner

*Primary Examiner* — Geoffrey S Evans
(74) *Attorney, Agent, or Firm* — Perkins Coie LLP

(57) ABSTRACT

A contactor device used in a wire-feeder employed in a welding system is disclosed. The contactor uses oversized nuts, increased torque and surface features to increase the heat dissipation of the contactor. This solution is an economical way of increasing heat dissipation to extend the life of contactors that are subject to failure due to heating and increased internal resistance.

22 Claims, 6 Drawing Sheets

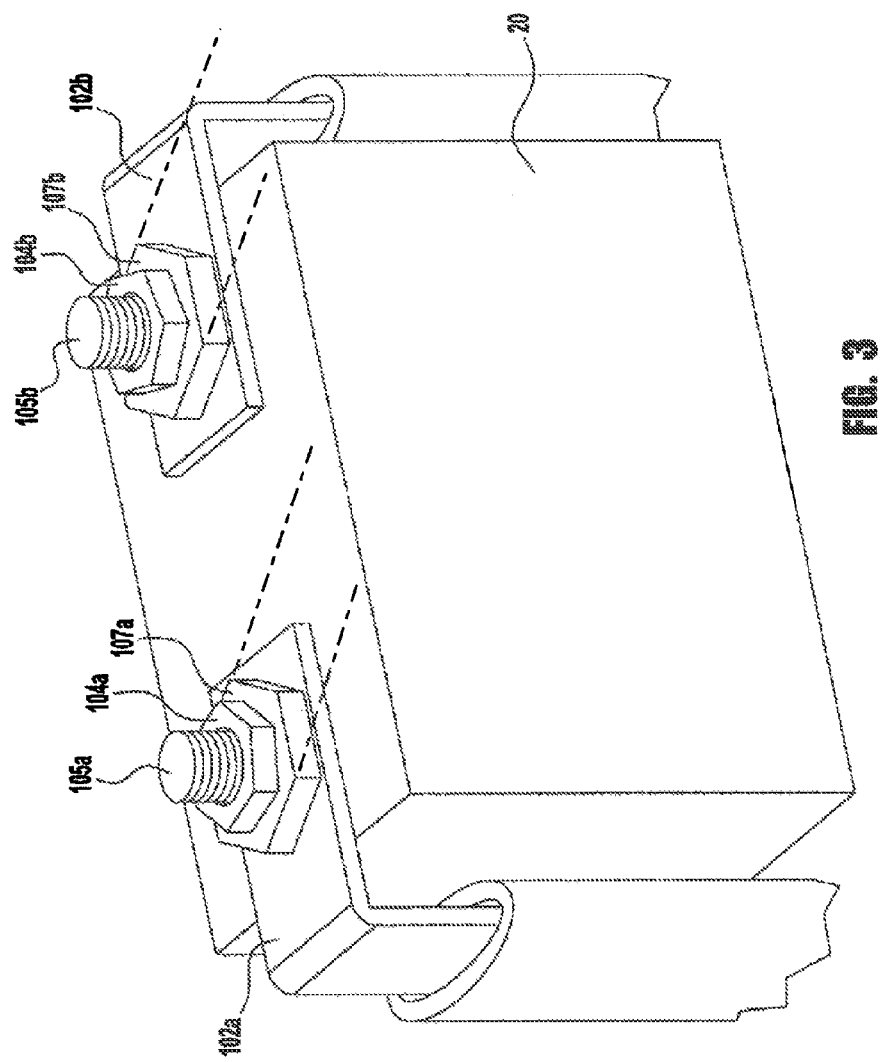

WELDING CONTRACTOR APPARATUS WITH IMPROVED HEAT DISSIPATION

BACKGROUND

1. Field of the Invention

The present invention relates to the art of welding with wire-feeders and improved heat dissipation on a contactor used in welding systems with wire-feeders.

2. Background

Modern wire-feeders in welding systems employ an electromechanical switch known as a "contactor" to electrically connect a welding gun to its power supply at the appropriate time. For the welding gun to operate, the contactor (or switch) is closed as the operator depresses the trigger of the welding gun. That is, pulling the trigger on the gun causes a solenoid in the contactor to move a bridge that brings the welding gun in electrical connection with the welding power source. Because of the high currents used in welding, arcs form in the contactor as the solenoid opens and closes the electrical circuit. Over time these arcs erode the metal at the point of electrical contact, resulting in increased resistance within the contactor. This increased resistance is the primary cause of heat dissipation problems and overall contactor degradation—ultimately resulting in device failure for the contactor.

In practice, the solution to contactor degradation has been to make the contactor inexpensive and easy to replace. This solution, however, cannot avoid the problems caused when a contactor fails in the middle of a weld process. Depending on the weld, a contactor failure during the middle of a weld may force the partially welded pieces to be scrapped. Accordingly, a contactor with a longer lifetime before failure is desired. Contactors, however, are price sensitive products where inexpensive improvements extending the life of contactors are highly desired. For example, solid state contactors last longer than electromechanical contactors, but are not used as widely because they cost significantly more than electromechanical contactors.

Over the lifetime of an electromechanical contactor, the internal resistance increases as a result of the arcing that occurs when the contactor is switched on and off. This resistance impedes current flow, reduces the voltage supplied to the welding gun, and creates significant heating problems. Because of the high currents passing through the contactor, the heating problems often lead to device failure. As such, an economical solution for improving heat dissipation is needed in the market.

SUMMARY

In one embodiment, an electromechanical contactor apparatus used in a wire-feeder employed in a welding system comprises: a first and second threaded electrical post; a first and second bus line in electrical connection with the first and second threaded electrical posts, respectively; a first and second locking nut connected to the first and second threaded electrical posts, respectively; and a first and second oversized nut in electrical connection with the first and second threaded electrical posts, respectively, wherein each oversized nut is in electrical contact with and between its respective bus line and locking nut.

In another embodiment, an electromechanical contactor apparatus used in a wire-feeder employed in a welding system comprises: a first and second threaded electrical post; a first and second bus line in electrical connection with the first and second threaded electrical posts, respectively; a first and second locking nut connected to the first and second threaded electrical posts, respectively; and a first and second oversized nut in electrical connection with the first and second threaded electrical posts, respectively, wherein each oversized nut is in electrical contact with and between its respective bus line and locking nut, and wherein at least one oversized nut is overtorqued.

In another embodiment, an electromechanical contactor apparatus used in a wire-feeder employed in a welding system comprises: a first and second threaded electrical post; a first and second bus line in electrical connection with the first and second threaded electrical posts, respectively; a first and second locking nut connected to the first and second threaded electrical posts, respectively; and a first and second oversized nut in electrical connection with the first and second threaded electrical posts, respectively, wherein each oversized nut is in electrical contact with and between its respective bus line and locking nut, and wherein at least one oversized nut is overtorqued and contains ridges on at least a portion of the oversized nut's top surface.

In another embodiment, an electromechanical contactor apparatus used in a wire-feeder employed in a welding system comprises: a first and second threaded electrical post; a first and second bus line in electrical connection with the first and second threaded electrical posts, respectively; a first and second locking nut connected to the first and second threaded electrical posts, respectively; and a first and second oversized nut in electrical connection with the first and second threaded electrical posts, respectively, wherein each oversized nut is in electrical contact with and between its respective bus line and locking nut; wherein the width of at least one oversized nut is at least 1.5 times the width of its respective locking nut; and wherein the torque of the at least one oversized nut is between 10.0 foot-pounds and 85.0 foot-pounds.

BRIEF DESCRIPTION OF THE DRAWINGS

FIG. 3 is a modified contactor with improved heat dissipation features according to an embodiment of the present invention.

DETAILED DESCRIPTION

Figure 1:
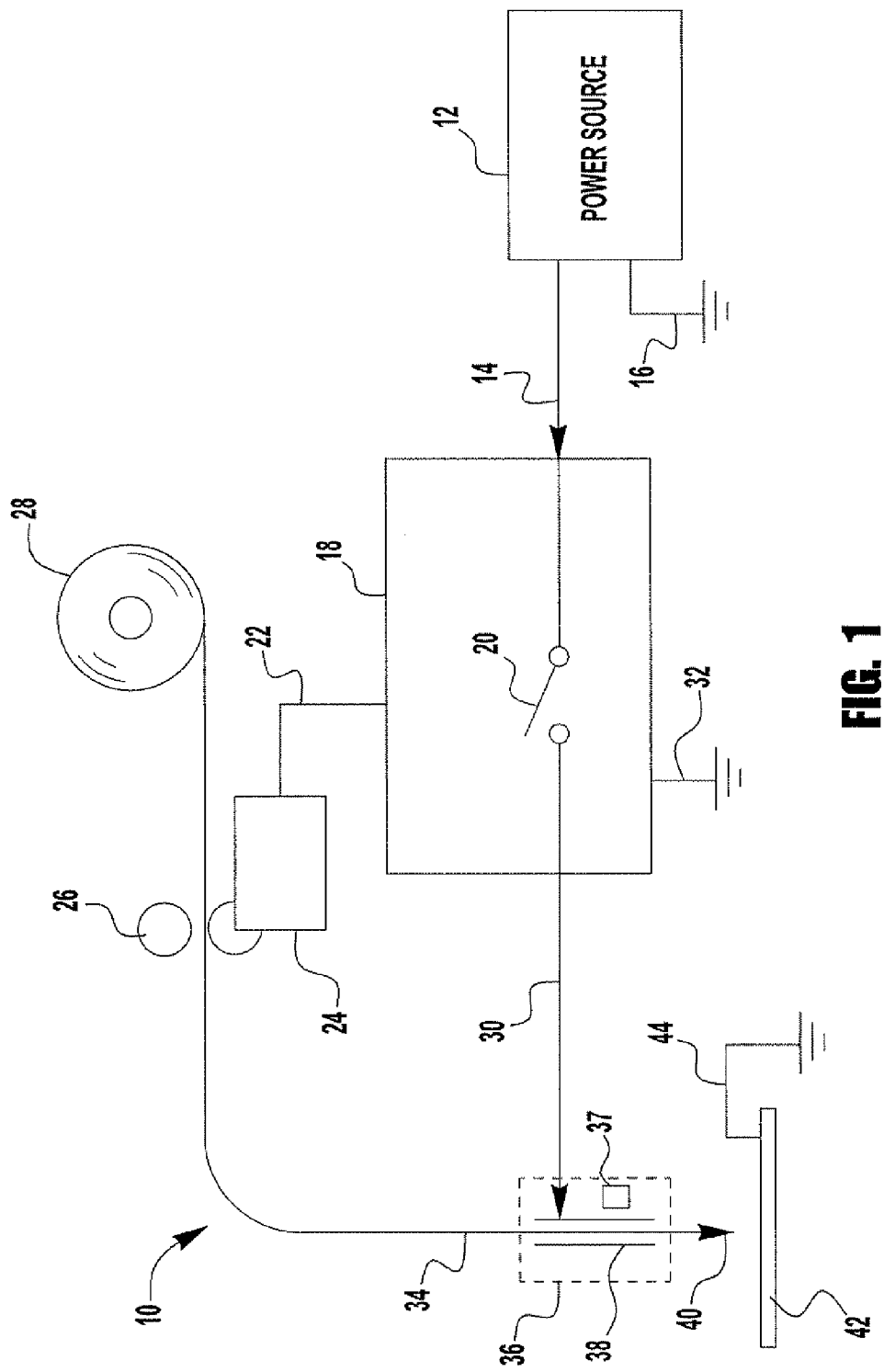
FIG. 1 is a typical arrangement for a welding system with a wire-feeder.

Welding systems with the consumable wire supplied by a wire-feeder, as shown in FIG. 1, are commonly used to weld metals. These welding systems can be operated manually or automatically where a robot is programmed by a machine. Welding system 10 includes a power source 12, wire-feeder 18, contactor 20, wire spool 28, welding gun 36, electrode 40, and workpiece 42. Power source 12 connects to wire-feeder 18 via lead 14. Wire-feeder 18 connects to welding gun 36 via lead 30. Wire-feeder 18 also controls roller motor 24 via lead 22 and contains contactor 20. Contactor 20 is an electrical switch that is typically called "contactor" rather than "switch" in the industry. Contactor 20 is typically an electromechanical contactor, which switches on and off using a solenoid to physically move a bridge into electrical connection at a contact point. In another embodiment, contactor 20 is a solid-state type contactor, where it is switched on and off using solid-state circuitry rather than electromechanical switching. By way of lead 22, wire-feeder 18 controls roller motor 24, which operates rollers 26. Rollers 26 are used to feed wire 34 to welding gun 36. Wire 34 is stored in wire spool 28. Welding gun 36 contains trigger 37 and contains electrical contact tip 38 where wire 34 is fed through. In addition, welding gun 36 is supplied electrical power via lead 30 and exposes electrode 40 to workpiece 42. Power source 12, wire-feeder 18, and workpiece 42 are connected to electrical ground via leads 16, 32, and 44, respectively.

Welding system 10 creates a weld on workpiece 42 when an operator depresses trigger 37 in welding gun 36. When trigger 37 is depressed, contactor 20 closes (i.e. turns on) to allow current to flow from power source 12 to welding gun 36. As the weld is created, rollers 26 feed wire 34 to welding gun 36. Wire 34 is ultimately deposited on workpiece 42 at electrode 40 to create the weld. Welding ceases when the operator releases trigger 37, which causes contactor 20 to open (i.e., turn off) preventing the flow of current from power source 12 to welding gun 36. In one embodiment, welding gun 36 and trigger 37 are operated by an automatic robot rather than a human.

Welding system 10 in FIG. 1 depicts a wire feeder used in an arc welding system. Clearly, wire-feeder 18 can be used in any welding system that requires consumable wire to be fed to create the weld. According to additional embodiments of the invention, therefore, wire feeder 18 and contactor 20 are used in a variety of welding systems (in addition to arc welding systems) where consumable wire is fed with a wire feeder.

Figure 2:
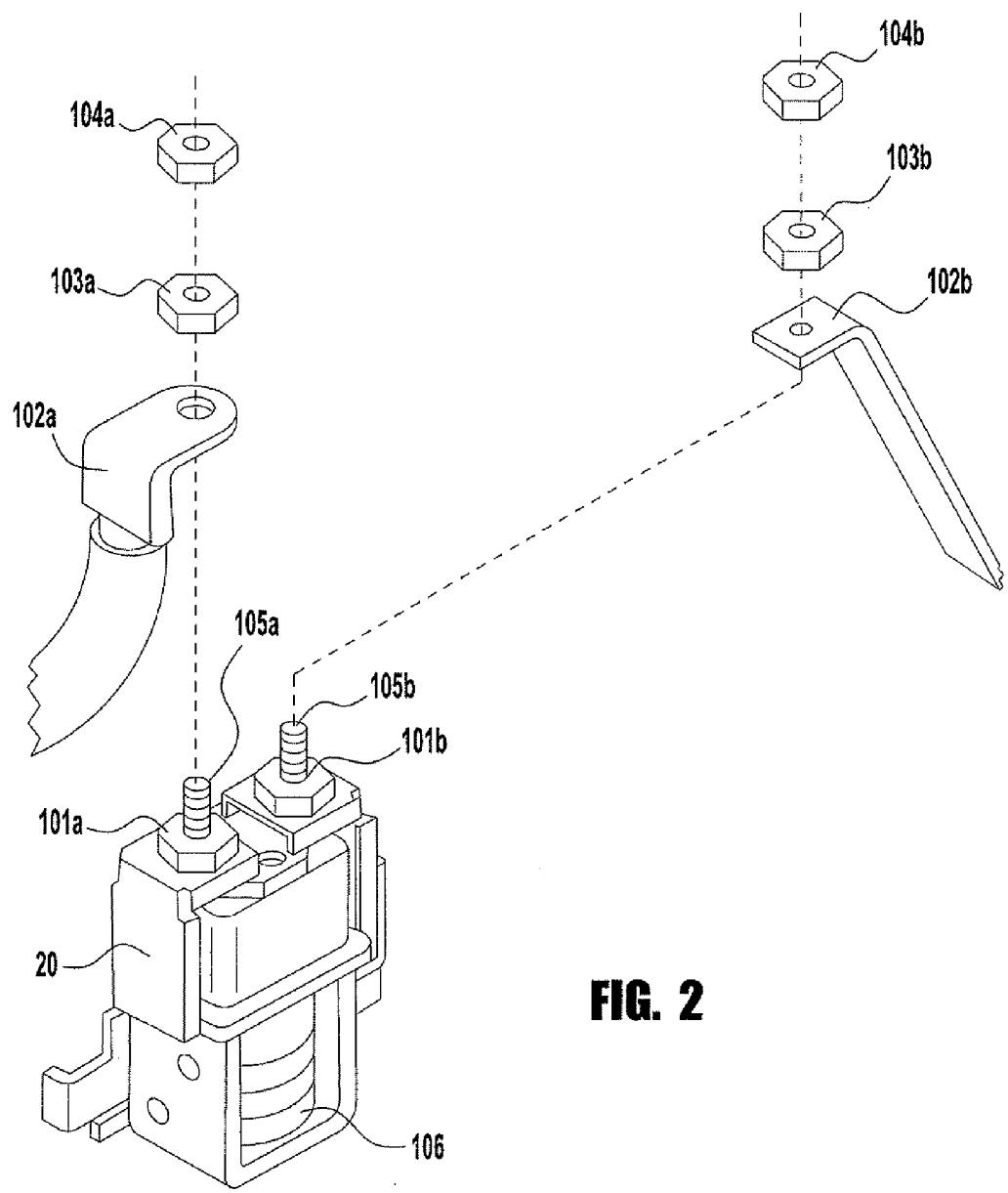
FIG. 2 is an expanded view of the common elements in a contactor used in wire-feeder.

FIG. 2 demonstrates a typical contactor 20. Contactor 20 switches on when control signals force solenoid 106 to physically move an internal bridge to electrically connect post 105a and post 105b. Post 105b is attached to bus 102b, which is connected to power source 12 via lead 14. Post 105a is attached to bus 102a, which is connected to welding gun 36 via lead 30. Thus, switching contactor 20 into the on position allows current to flow from power supply 12 to welding gun 36 through contactor 20. Bus 102a and bus 102b are respectively attached to posts 105a and 105b with several nuts. Specifically, bus 102a is between nut 101a and nut 103a, with locking nut 104a placed on top of nut 103a. Similarly, bus 102b is between nut 101b and nut 103b, with locking nut 104b placed on top of nut 103b.

The high currents used in welding result in electrical arcs inside contactor 20 as solenoid 106 brings the internal bridge into and out of contact with posts 105a and 105b. That is, arcs of electricity appear in the gap between the internal bridge and posts 105a and 105b as the internal bridge is moved up or down by solenoid 106. These arcs erode the metal in the internal bridge and posts 105a and 105b and increase the electrical resistance at their interface. Thus, current flowing from power source 12 to welding gun 36 meets increased resistance the longer contactor 20 is used. This increased resistance impedes current flow, reduces the voltage supplied to welding gun 36, and generates significant thermal heating. Further, heat alone will increase the resistance in a conductor. In the end, the heat generated in contactor 20 impairs performance significantly and is often the ultimate cause of failure for contactor 20.

FIG. 3 illustrates contactor 20 with improved heat dissipation ability according to one embodiment of the present invention. Here, oversized nuts 107a and 107b replace nuts 103a and 103b, respectively. Oversized nuts 107a and 107b are larger than nuts 103a and 103b and serve to dissipate heat more rapidly. Nuts 103a and 103b are typically the same size or close to the same size as locking nuts 104a and 104b. The additional surface area of oversized nuts 107a and 107b allows the heat generated in contactor 20 to dissipate more rapidly. This results in lower internal resistance, better conduction of current, and a longer lifetime for contactor 20. The improved heat dissipation can benefit electromechanical and solid state contactors alike because both types demonstrate improved performance with greater heat dissipation. Using oversized nuts 107a and 107b provide an economical manner of improving heat dissipation because one can use "off the shelf" oversized nuts 107a and 107b or manufacture custom oversized nuts 107a and 107b for little additional cost over standard size nuts 103a and 103b. In one embodiment oversized nuts 107a and 107b are the same size as each other and in another embodiment the oversized nuts 107a and 107b differ in size.

In one embodiment, oversized nuts 107a and 107b are at least 28 mm wide and nuts 103a and 103b are 16 mm wide. In another embodiment, oversized nuts 107a and 107b are between 20 mm and 100 mm wide. In still another embodiment, oversized nuts 107a and 107b are at least 1.5 times larger than nuts 103a and 103b.

In another embodiment, oversized nuts 107a and 107b are over-torqued. That is, the torque applied to oversized nuts 107a and 107b is greater than the torque normally required. This increased torque allows greater contact with buses 102a and 102b, which promotes improved heat transfer. Because the metal surfaces of oversized nuts 107a and 107b and buses 102a and 102b are irregular and not perfectly flat, gaps typically exist where the two separate surfaces do not contact each other. Over-torquing reduces these gaps by forcing the metals closer together. In addition, the increased compression at the interface promotes heat transfer. The improved heat flow allows for greater heat dissipation from oversized nuts 107a and 107b. Accordingly, increased torque on the oversized nuts results in greater heat dissipation and improved contactor performance. In one embodiment, each oversized nut 107a and 107b is over-torqued by being set to a torque value of between 10.0 foot-pounds and 35.0 foot-pounds. In another embodiment, each oversized nut 107a and 107b is over-torqued by being set to a torque value of between 10.0 foot-pounds and 85.0 foot-pounds.

Figure 4A:
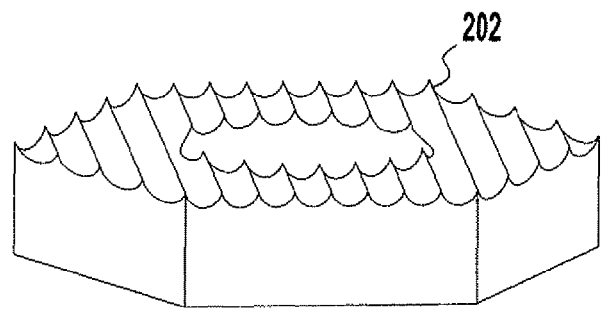
FIGS. 4a-4c depict an oversized nut with ridges according to an embodiment of the present invention.
Figure 4B:
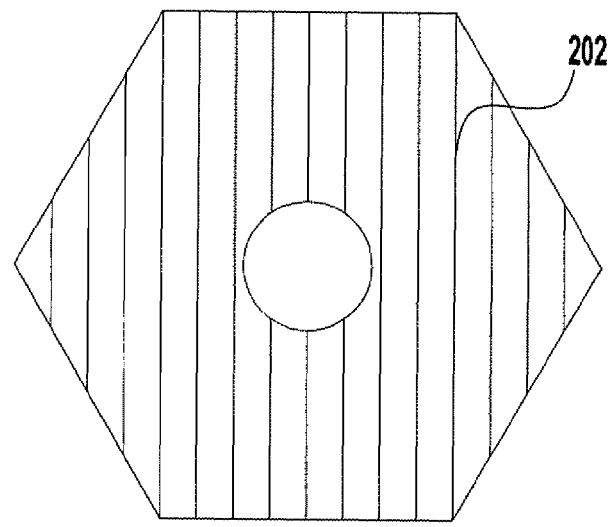
Figure 4C:
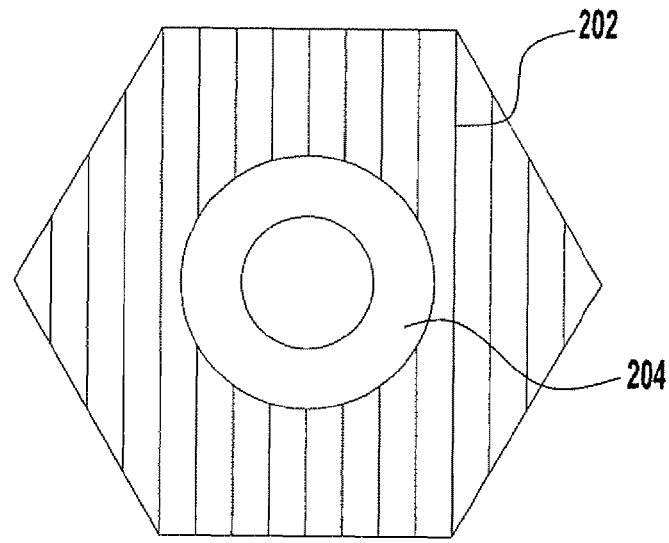
Figure 5A:
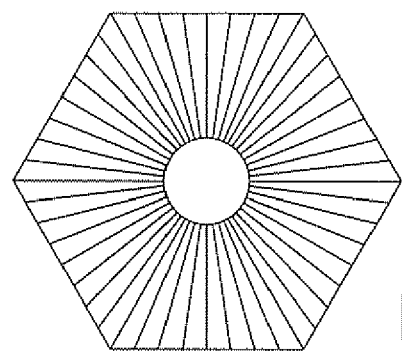
FIGS. 5a-5d provide examples of various patterns of ridges from a "top down" perspective according to embodiments of the present invention.
Figure 5B:
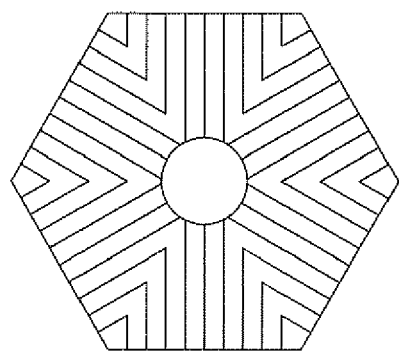
Figure 5C:
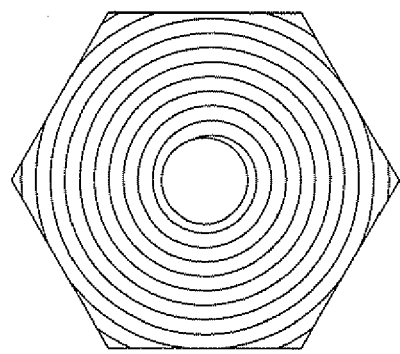
Figure 5D:
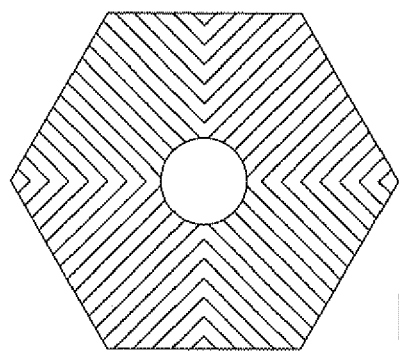
Figure 6A:
FIGS. 6a-6g provide examples of various patterns of ridges from a cross section perspective according to embodiments of the present invention.
Figure 6B:
Figure 6C:
Figure 6D:
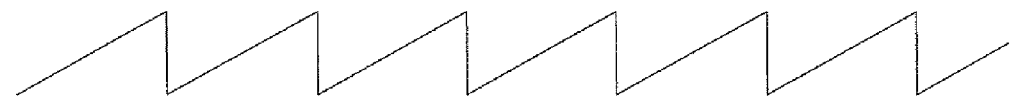
Figure 6E:
Figure 6F:
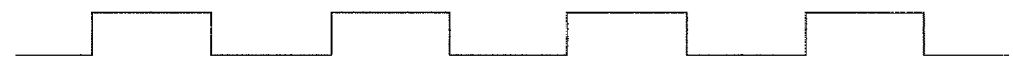
Figure 6G:

In another embodiment, oversized nuts 107a and 107b are manufactured with features to create greater surface area. Greater surface area in contact with the ambient air allows for increased heat dissipation capabilities. Accordingly, the top surface of oversized nuts 107a and 107b (i.e., the surface opposite the electrical bus and partially touching the locking nut) can have ridges or deformations to increase the surface area exposed to ambient air. Ridges or deformations on at least part of the top surface of oversized nuts 107a and 107b allows the ambient air to draw away additional heat from contactor 20. FIGS. 4a to 4c show an oversized nut with ridges 202. FIGS. 4a and 4b illustrate two views of an oversized nut with ridges on the entire top surface of the oversized nut. FIG. 4c illustrates an oversized nut with ridges covering only a portion of the top surface of the oversized nut. Section 204 is an area on the top surface of an oversized nut without ridges and is shown in a circular pattern centered in the middle of the oversized nut, but can be a variety of shapes and located in other locations on the top of the oversized nut. FIG. 5 demonstrates some examples of non-linear patterns of ridges. The ridges 202 do not need to be aligned linearly as depicted in FIGS. 4a to 4c. Rather, the ridges can accomplish the same goal of increasing surface area and improving heat dissipation even where the ridges 202 do not align linearly across the entire surface. It follows, therefore, that many patterns of ridges or deformations can increase the surface area and improve heat dissipation. These patterns of ridges can vary from a "top down" perspective as seen in FIG. 5 or vary as seen in the examples depicted in the cross section views of ridges in FIG. 6.

It is noted that although the present invention has been discussed above specifically with respect to welding applications, the present invention is not limited to this and can be employed in any similar applications. While the invention has been described in terms of various specific embodiments, those skilled in the art will recognize that the invention can be practiced with modification within the spirit and scope of the claims.

What is claimed is:

1. An electromechanical contactor apparatus used in a wire-feeder employed in a welding system, comprising:
   a first threaded electrical post; and a second threaded electrical post;
   a first bus line; and a second bus line in electrical connection with the first and second threaded electrical posts;
   a first locking nut connected to the first threaded electrical post and a second locking nut connected to the second threaded electrical post; and
   a first oversized nut in electrical connection with the first threaded electrical post between the first bus line and the first locking nut so as to be in electrical contact with the first bus line and the first locking nut; and
   a second oversized nut in electrical connection with the second threaded electrical post between the second bus line and the second locking nut so as to be in electrical contact with the second bus line and the second locking nut,
   wherein each of the first and second locking nuts and each of the first and second oversized nuts define a width, the width of at least one of the first and second oversized nuts is at least 1.5 times the width of the one first or second locking nut in electrical contact with the at least one over sized nut.

2. The apparatus of claim 1, wherein each of the first and second oversized nuts define a width, wherein further the width of the first oversized nut and the width of the second oversized nut are not the same.

3. The apparatus of claim 1, wherein at least one of the first and second oversized nuts is over-torqued.

4. The apparatus of claim 3, wherein the torque of at least one oversized nut is between 10.0 foot-pounds and 85.0 foot-pounds.

5. The apparatus of claim 1, wherein at least one of the first and second oversized nuts include a surface in electrical contact with one of the locking nuts or one of the bus lines, the surface having a plurality of ridges on at least a portion of the surface.

6. The apparatus of claim 5 wherein the ridges form a linear pattern.

7. The apparatus of claim 5, wherein the at least one oversized nut includes deformations between said the plurality of.

8. An electromechanical contactor apparatus used in a wire-feeder employed in a welding system, comprising:
   a first threaded electrical post and a second threaded electrical post;
   a first bus line in electrical connection with the first threaded electrical post and a second bus line in electrical connection with the second threaded electrical post;
   a first locking nut connected to the first threaded electrical post and a second locking nut connected to the second threaded electrical post; and
   a first oversized nut disposed between the first bus line and the first locking nut and a second oversized nut disposed between the second bus line and the second locking nut, and wherein the first oversized nut is over-torqued about the first threaded electrical post and the second oversized nut is over-torqued about the second threaded electrical post each in a range between 10.0 foot-pounds and 85.0 foot-pounds so as to reduce any gaps between the first oversized nut and the first bus line and between the first oversized nut and the first locking nut and to reduce any gaps between the second oversized nut and the second bus line and between the first oversized nut and the second locking nut,
   wherein the width of at least one oversized nut is at least 1.5 times the width of its respective locking nut.

9. The apparatus of claim 8, wherein the torque of at least one oversized nut is between 10.0 foot-pounds and 35.0 foot-pounds.

10. The apparatus of claim 8, wherein each of the first and second oversized nuts define a width, wherein further the width of the first oversized nut and the width of the second oversized nut are not the same.

11. The apparatus of claim 8, wherein at least one of the first and second oversized nuts include a surface in electrical contact with one of the locking nuts or one of the bus lines, the surface having a plurality of ridges on at least a portion of the surface.

12. The apparatus of claim 11, wherein the ridges form a linear pattern.

13. The apparatus of claim 11, wherein the at least one oversized nut includes deformations between said the plurality of ridges.

14. An electromechanical contactor apparatus used in a wire-feeder employed in a welding system, comprising:
   a first threaded electrical post and a second threaded electrical post;
   a first locking nut connected to the first threaded electrical post and a second locking nut connected to the second threaded electrical post; and
   a first oversized nut having a surface in electrical contact with the first locking nut and a second oversized nut having a surface in electrical contact with the second locking nut,
   wherein at least one of the first and second oversized nuts is over-torqued and wherein further the surface of the at least one nut has a portion that including ridges,
   wherein each of the first and second locking nuts and each of the first and second oversized nuts define a width, the width of the at least one of the first and second oversized nuts is at least 1.5 times the width of the locking nut in electrical contact with the at least one oversized nut.

15. The apparatus of claim 14, wherein the at least one oversized nut is torqued about a threaded electrical post a torque ranging between 10.0 foot-pounds and 85.0 foot-pounds.

16. The apparatus of claim 14, wherein each of the first and second locking nuts define a width, wherein further the width of the first and second oversized nuts are not the same.

17. The apparatus of claim 14, wherein the ridges form a linear pattern.

18. An electromechanical contactor apparatus used in a wire-feeder employed in a welding system, comprising:
   a threaded electrical post;
   a bus line in electrical connection with the threaded electrical post;

a locking nut connected to the threaded electrical post; and an oversized nut in electrical connection with the threaded electrical post and disposed;

between the bus line and the locking nut;

wherein the width of the oversized nut is at least 1.5 times the width of the locking nut.

19. The apparatus of claim 18, wherein the plurality of ridges define deformations therebetween.

20. The apparatus of claim 18, wherein the oversized nut having a surface with one portion in contact with the locking nut and another portion in contact with ambient air.

21. The apparatus of claim 20, wherein the portion of the surface in contact with ambient air includes a plurality of ridges.

22. The apparatus of claim 21, wherein the ridges form a linear pattern.

* * * * *